(12) United States Patent
Kristensen (10) Patent No.: US 9,183,369 B2
(45) Date of Patent: Nov. 10, 2015

(54) THUMB DRIVE GUEST USER

(75) Inventor: Kristian H. Kristensen, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1221 days.

(21) Appl. No.: 12/239,556

(22) Filed: Sep. 26, 2008

(65) Prior Publication Data

US 2010/0083368 A1    Apr. 1, 2010

(51) Int. Cl.
*H04L 9/32* (2006.01)
*G06F 21/00* (2013.01)
*G06F 21/34* (2013.01)

(52) U.S. Cl.
CPC ..................... *G06F 21/34* (2013.01)

(58) Field of Classification Search
USPC .................................................. 726/2, 16–18
See application file for complete search history.

(56) References Cited

U.S. PATENT DOCUMENTS

| 7,441,108 | B2 * | 10/2008 | Fisher et al. | 712/227 |
|---|---|---|---|---|
| 2007/0016452 | A1 * | 1/2007 | Wilson, III | 705/3 |
| 2007/0016800 | A1 * | 1/2007 | Spottswood et al. | 713/193 |
| 2007/0124536 | A1 * | 5/2007 | Carper | 711/115 |
| 2007/0195447 | A1 * | 8/2007 | Starr et al. | 360/72.1 |
| 2008/0104418 | A1 * | 5/2008 | Parnell | 713/193 |
| 2009/0147949 | A1 * | 6/2009 | Kirovski | 380/44 |
| 2010/0083366 | A1 * | 4/2010 | Challener et al. | 726/17 |

OTHER PUBLICATIONS

An Alternative Approach to Conflict Resolution for Real Time, Chandler et al, 2005.*
Integration 0 ER Account Database on Multiple OS Environment, Kuramae et al, IEEE 2002.*

* cited by examiner

*Primary Examiner* — Luu Pham
*Assistant Examiner* — Jahangir Kabir
(74) *Attorney, Agent, or Firm* — Lowenstein Sandler LLP (57) ABSTRACT

A method and system for managing a computer user, comprising initiating a user session for the computer user based on user data stored in one partition on a removable computer readable medium. The user data is associated with a user ID, and the user ID is stored on a second partition of the removable computer readable medium. The user ID is used to identify the user data to the computer user. The computer user is authenticated as being associated with the user data based in part on the user ID. Also described is an article of manufacture for creating a partition on a removable computer readable medium for storing user data and associating it with a second partition storing an associated user ID on the removable computer readable medium.

10 Claims, 5 Drawing Sheets

THUMB DRIVE GUEST USER

FIELD

An embodiment relates generally to the field of computer operating systems. More particularly, an embodiment relates to enabling a user to securely transport user data associated with the user's account from one computer to another.

COPYRIGHT NOTICE/PERMISSION

A portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright® 2008, Red Hat, Inc., All Rights Reserved.

BACKGROUND

Usability of personal computers is facilitated by the operating system that provides an interface between the user and the computer's hardware and software functions. One feature common to most modern operating systems is the concept of user accounts, which provides a mechanism for the operating system to manage multiple individuals or users who use a single computer. User accounts enhance usability by enabling the operating system to compartmentalize data among the individuals sharing a computer and to maintain customized settings for each of them. In an alternative use, an individual may have more than one user account on a single computer, in order to compartmentalize the different modes in which he or she uses the computer. For example, an individual may maintain one user account for personal use, and another user account for professional use. The term 'user' will be used in this description to denote a distinct user—i.e. an individual using a particular user account.

User accounts can be described as "native" to a particular computer. A user account is typically created on a computer when a particular user makes his or her first use of the computer. After the creation of the user account, the account exists on the computer as a means for that user to use the computer. All data and settings that the user creates or modifies are associated with that user account, and are stored on that computer, to which the account is native. The data and settings associated with the user account are typically not usable on other computers to which the account is not native. Some systems have centrally managed accounts, which are not native to a specific computer, but store and manage user accounts in a central network location. Such central account management systems typically require a backend server managed by an IT (information technology) department.

Two key concepts within the framework of user accounts are persistence and user sessions. Persistence involves presenting the computer to each user in the same state that the user left it the last time he or she used it, regardless of whether other users used it in the intervening period. The user state can include, but is not limited to, internet bookmarks, internet browsing history, email account settings, email contacts, desktop and graphical user interface (GUI) appearance, recently opened files, and contents of personal directories (such as the home directory in the LINUX® operating system, or the 'Documents and Settings\$USERNAME' directory in the MICROSOFT WINDOWS® operating system). All trademarks used herein are intended to identify a source of a product or goods; all trademarks are the properties of their respective owners. Persistence is enabled by the user session, which is a period of time during which the computer is used by a single user.

A user session is started when a user is granted access to a computer. The user commences the user session by "logging in," selecting his or her account from a list of accounts existing as native to the computer, or available from a central account manager. Alternatively, a user may create a new account if he or she is using the computer for the first time as a particular user. Once the user session has commenced, the user may use the computer—creating, modifying, and deleting files, or customizing settings such as appearance, look, and feel. When the user is done, he or she ends the session by "logging-out."

During a user session, a user is typically only allowed to use or modify files associated with his or her user account. Files associated with other user accounts are generally hidden. Similarly, during a user session, a user sees the computer in the same state as it existed when the user terminated his or her most recent user session. The user state is maintained by the operating system such that it is restored at the start of the user session. Thus, the user-account/user-session framework allows each user to enjoy a personalized view of the computer that persists across sessions, uncluttered by files belonging to other users. The user-account/user-session framework further provides for privacy and security of data by hiding files belonging to one user from other users.

Unfortunately, the information associated with a user account is typically confined to the computer on which it is native, on which it was originally created. In the case of centrally managed accounts, user account information is typically confined to the computers that are part of the IT system. A user who wishes to use a computer other than the one which he or she normally uses cannot create a user session associated with his or her usual user account on that machine. The only option typically available to such a user is to log in on the "Guest" user account. While this solution allows the user to use the host computer, it does not provide him or her with any of the state or data available to the user on his or her usual computer. A further drawback is privacy—information related to the tasks performed on the guest user account will remain on the host computer, which can be especially undesirable in situations where a user wishes to perform tasks related to his or her personal affairs on a computer owned by the user's employer.

If a user knows exactly what data he or she may need to use on a host computer, he or she can store that data on a portable media device (such as a USB drive, or "thumb-drive") as a work-around, using the portable media device on the guest user account. The thumb-drive-plus-guest-account work-around is by no means ideal, as it requires foreknowledge of exactly which files will be needed, and does not save customized preferences or solve the privacy problem outline above.

Another work-around involves carrying a full operating system installation on a portable media device, and booting the host computer into that installation. The portable OS installation solution presents problems stemming from the data space it requires, as well as the inconvenience of requiring a full reboot to start and end the session. Furthermore, not all systems support booting from a portable media device.

BRIEF DESCRIPTION OF THE DRAWINGS

The following description includes discussion of figures having illustrations given by way of example of implementa

DETAILED DESCRIPTION

Mechanisms allow for initiating a user session on a host computer using user account data from another computer, where the account data is stored on a portable media device. For example, in one embodiment, user account data may be stored in one encrypted partition of a portable media device, and an associated user account identifier is stored in a second, unencrypted partition of the portable media device. In an embodiment, a computer operating system detects the portable media device and provides the user with an option to initiate a session with the user account associated with the user ID. To initiate the session, the user provides a password which is used to decrypt the encrypted data portion, and if decryption is successful, a user session is initiated with the user data.

In the following description, numerous details are set forth. It will be apparent, however, to one skilled in the art, that the described implementations may be practiced without these specific details. In some instances, well-known structures and devices are shown in block diagram form, rather than in detail, in order to avoid obscuring innovative aspects.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required operations of the method. Structure for a variety of these systems will appear as set forth in the description below. In addition, the present invention is not described with reference to any particular programming language. It will be appreciated that a variety of programming languages may be used to implement the teachings of the invention as described herein.

In general, the embodiments described herein enable a portable user account, wherein a user stores account state and data on a removable storage medium and then can initiate a session with the stored user account on computers to which it is not native.

In one embodiment, the invention is implemented as part of a computer operating system (OS), such as the LINUX® FEDORA® desktop. Such an embodiment can further be implemented as a desktop utility through which a user saves his or her user account to a removable storage media device, for example a USB drive. Such a utility packages and stores on the device all data and files associated with the OS user account and needed to create a user session for that user account within the OS. One embodiment stores all data and files in one partition of the removable device, which it encrypts based on a user-provided input or key. In such an embodiment, an identification (ID) associated with the user account is stored in a separate, unencrypted configuration partition of the device, along with the location of the associated encrypted data portion, and any other required configuration information. Additionally, if more than one user account is stored on a particular media device, all user account IDs, the location of associated data partitions, and the configuration information may all be stored in one table-like block on the media device.

An OS can further integrate an embodiment into existing user management interfaces that are well known in the art. Examples of such interfaces include, but are not limited to the user sign-on dialog displayed by many OS's on start-up and the fast-user-switching dialog used by many OS's to allow switching between user-accounts without the delay of a normal log-off operation. Integration of such an embodiment into user management interfaces is described in more detail below, in reference to FIGS. 3A and 3B.

To provide for security, one embodiment involves authenticating a user before initiating a user session from the data stored on the removable media device. In this embodiment, the user account ID is read from an unencrypted portion of the media device. When the user attempts to initiate a session with the user account associated with the ID, the user is required to input a security key, such as a password. The user is only allowed to initiate the session if the data partition associated with the user account ID can be successfully decrypted with the security key.

In an implementation as part of the LINUX® operating system, the user account state and data include, but may not be limited to, the user account home directory. Similarly, in an implementation as part of the MICROSOFT WINDOWS® operating system, the user account state and data include, but may not be limited to, the Documents and Settings\$USERNAME directory associated with the user account, where $USERNAME is the user account ID.

Existing OS's are known to identify files by an ID of the user account associated with the file. Such an OS may present problems when there is a mismatch between an ID temporarily assigned to the non-native account by the host computer and the ID associated with its files, which is typically the ID assigned to the account on the computer to which it is native. To solve the problem of mismatched IDs, an implementation specific to such an OS provides a translation layer. The translation layer is implemented in the file-system interface, enabling interception of file operations to hide any inconsistencies. The translation layer hides inconsistencies, for example, by mapping host-assigned account IDs to file-associated account IDs through a look-up table. In one embodiment, this translation layer is implemented as part of the device driver that interfaces the removable media device with the OS.

Such an implementation may always employ the translation layer in file system operations, or may only employ the translation layer in the event that the ID given by the host computer to the non-native user account differs from the ID stored on the files. Such an implementation may detect a mismatch of IDs within the mechanism that assigns a temporary ID to the non-native account on the host computer.

Where the non-native user account ID conflicts with an ID assigned to a user account native to the host computer, the non-native user account ID is presented to the user in a modified form. For example, a unique number, or a suffix such as "–USB," may be appended. If multiple such conflicts occur, a different unique number may be appended to each duplicate ID. The unique number may be generated randomly or sequentially. Alternatively, the ID may be modified by appending a suffix followed by a unique number. Where this modification requires translation of IDs associated with files, a translation layer is provided, as discussed above.

Consider an example to illustrate and expand upon the above-mentioned concepts of identifying files by a user account ID. Linux filesystems (as well as filesystems of other Unix-like systems) use two types of user identification: user name and user ID. The user name is a short name used to identify the user (e.g., "krh"), and the user ID is a number assigned to the user name by a given system. Multiple user IDs could apply to the same user name. The user ID for a given user name can be local to a single computer, or it can be shared and consistent across a network of machines. Consider a user with a user name "krh." On a laptop typically used by the user, user name krh may be associated with user ID 400, while it may be associated with the user ID 3024 on a central server to which the user may log on. Linux filesystems typically track the owner of a file by associating the user ID with the file, but not the user name. Thus, when inserting a USB stick with a home directory on it in a Linux computer, there may be multiple types of clashes/mismatches that occur. The first is that a user name (e.g., "krh") may already exist on the computer. Thus, a modified user name (e.g., "krh-USB") may be used. A second mismatch is that one a unique user name has been determined, the system creates and assigns a user ID. There is no guarantee the assigned user ID will match the number assigned to the files on the USB stick. Thus, a file-system translation layer may be employed to map the on-disk user IDs to the user ID assigned to the newly created user.

Figure 1:
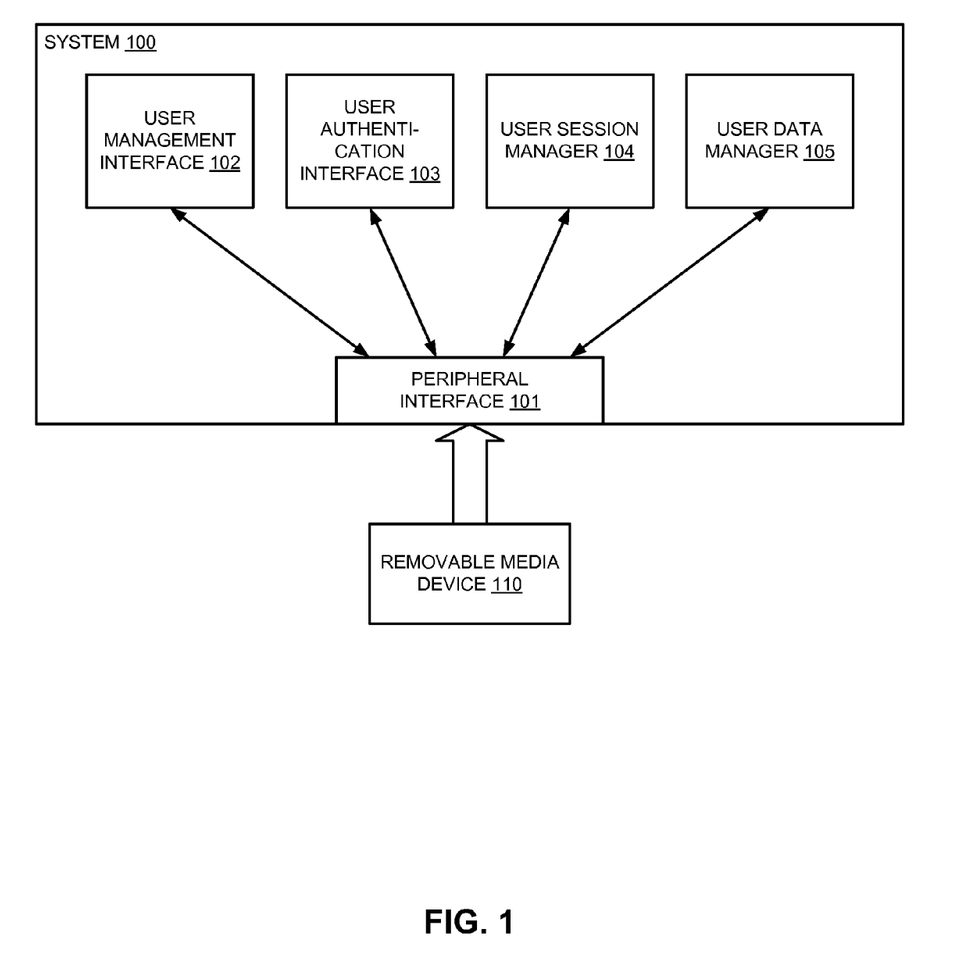
- FIG. 1 is a block diagram of an exemplary embodiment of a system for enabling user sessions from a portable media device.

FIG. 1 illustrates an embodiment of a system 100 for enabling user sessions from a portable media device. The system 100 reads user IDs from removable media device 110 via peripheral interface 101. The user IDs are presented to a user via user management interface 102. If the user wishes to initiate a session with the user data associated with a user ID found on removable media device 110, the user authenticates himself through user authentication interface 103. If authentication is successful, user session manager 104 initiates a user session with the data associated with the user ID. The user data manage 105 then makes the user data on removable media device 110 available to a host computer for the duration of the user session.

Figure 2:
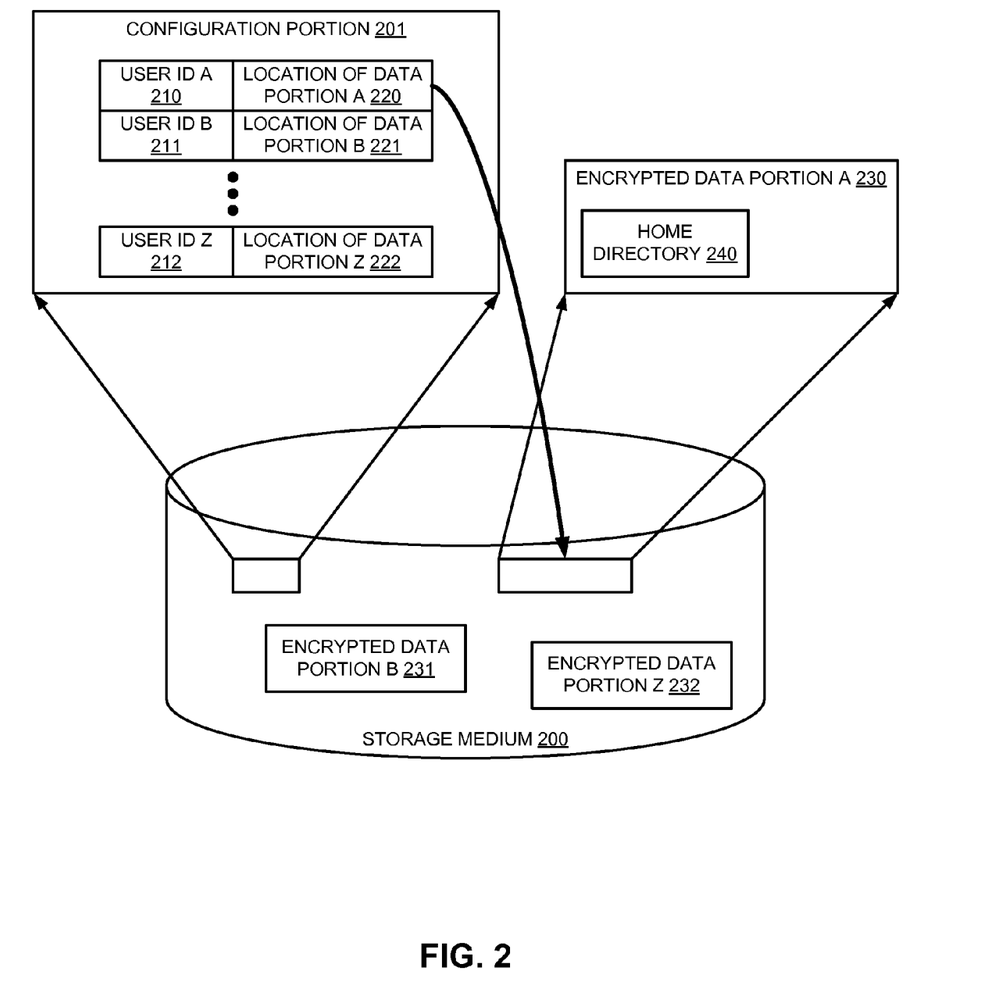
FIG. 2 is a block diagram of an exemplary embodiment of a storage medium on which user account information is stored in the form of a configuration portion and a data portion.

FIG. 2 illustrates an embodiment where state and data associated with multiple user accounts are stored on a portable storage medium 200. As illustrated, all user account IDs are stored in one unencrypted configuration partition 201. Stored with each user account ID A-Z, 210, 211, and 212, is the location, 220, 221, and 222, of an associated encrypted data partition, 230, 231, and 232, respectively.

One embodiment reads all of the user IDs, 210, 211, and 212, from the unencrypted data portion 201. A user management interface, such as the implementation illustrated in FIGS. 3A-B and discussed below, then presents to the user a means to select one of the user IDs to initiate a session with the user account associated with the ID. In one embodiment, presenting the user IDs to the user requires adding the user IDs read from the unencrypted data portion 201 to a system user list (e.g., a user list maintained by the operating system). The interface obtains user input, such as a password or key, which the embodiment uses to attempt decryption of the encrypted data partition found at the location associated with the selected user ID. If decryption is successful, the embodiment initiates a user session with the user account data in the decrypted partition. When the portable media device is ejected after the completion of the user session, the user IDs will generally be removed from the system user list.

For example, when the user selects the user account ID at 210, the user management interface obtains a password or key from the user. The password or key is then used to attempt decryption of the encrypted data partition, 230, pointed to by the location, 220, associated with user account ID A. Upon successful decryption, the embodiment initiates a user session with the account data contained within the newly decrypted data partition 230. As illustrated in the figure, partition 230 contains home directory, 240, which holds all state and data associated with the user account identified by user ID A, 210. In addition to the example of a home directory, the various data partitions could include other user-specific data, such as that described above. In summary, internet bookmarks, internet browsing history, email account settings, email contacts, desktop and graphical user interface (GUI) appearance, recently opened files, and/or configuration and personal settings files may be included in a partition.

In one embodiment, data partitions 230, 231, and 232 are not encrypted. In an implementation where the data partitions are encrypted, security is enhanced, and authentication of the user is simplified. Authentication can occur through the use of, for example, a password that decrypts the data partition. If the password does not decrypt the data partition, authentication fails. In alternative implementations, other authentication mechanisms can be used. Thus, the portable media device can deny all access to all partitions, and then require compliance with any of multiple known authentication mechanisms (e.g., there are many known authentication protocol exchanges that could be used). The authentication mechanism can be built onto the portable media device, and used to obtain access to the device. The configuration portion of the portable media device can provide an encrypted password to the system along with the user ID data. Thus, the system can authenticate the user, and the data portion can be unencrypted on the portable media device.

A portable media device can be created by accessing a removable computer readable medium such as a USB device, and creating the separate portions on the media. The computer system accessing the USB device can create and store on the removable computer readable medium a data portion having consolidated data associated with a user identifier (ID), for example through a tool or module. The consolidated data includes user files associated with the user ID. The data portion is optionally encrypted, such as by a password or other input received from a user that drives creation of the removable computer readable medium. Alternatively, the system can store authentication protocol information or configuration information to pass data with a password to enable the system to authenticate the user. The system also creates and stores on the removable computer readable medium a configuration portion having the user ID associated with a computer user and a location of the data portion. The configuration portion includes configuration settings that enable initiation of a user session on the host computer for the computer user with the user ID. The system associates the location of the data portion with the configuration portion, for example, by generating a pointer or other indirection mechanism on the removable computer readable medium.

Figure 3A:
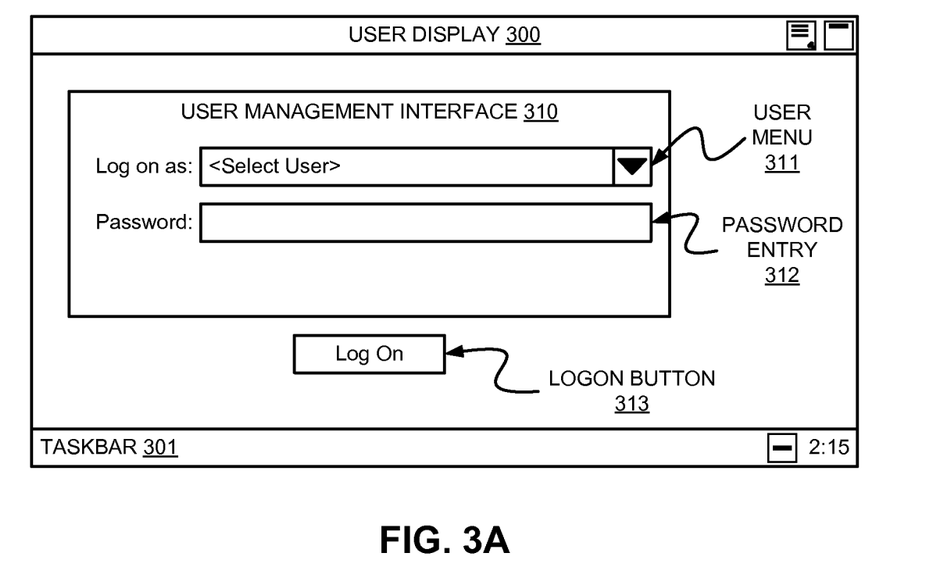
FIG. 3A is a block diagram of an exemplary embodiment of a user interface through which a user selects a user account and inputs a password for authentication.
Figure 3B:
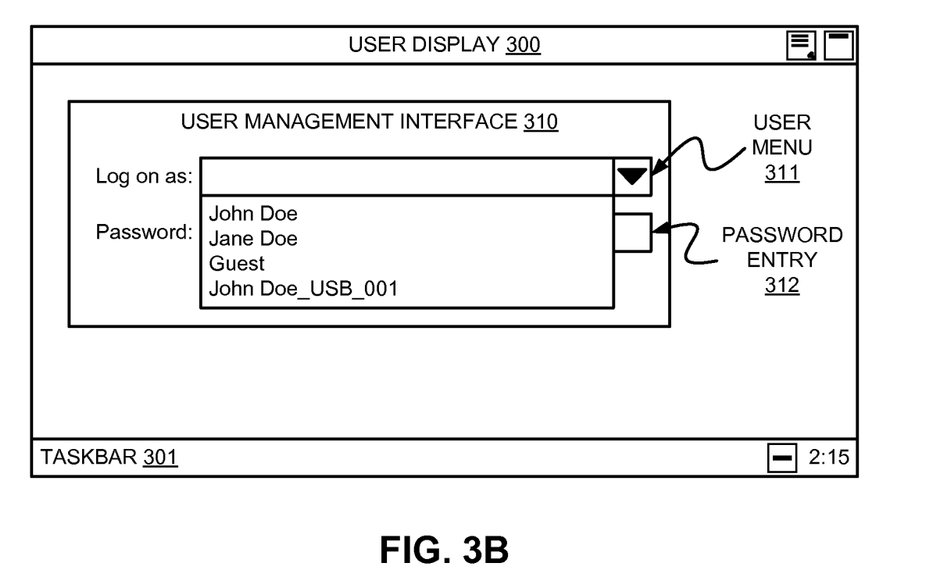
FIG. 3B is a block diagram of an exemplary embodiment of a user interface through which a user selects a user account and inputs a password for authentication.

FIG. 3A illustrates a graphical user interface typical of what modern OS's use to manage user account sessions. User management interface 310 is representative of an interface that can be used both to start a new session and to switch between sessions, enabling what is known in the art as fast-user-switching. User menu 311 is a drop-down list displaying user account IDs for existing user accounts native to the computer displaying the interface. Users select the ID for the account under which they wish to log on and initiate a session from this drop-down list, and then enter the password for that account into password entry field 312. Once a password is entered, a user clicks or presses the Logon button 313, which causes the OS to authenticate the password, and if authentication is successful, initiate a session with the user account.

In alternative embodiments other forms of user input can be used for authentication; examples include biometrics, physical cards with embedded identification keys, or any combination of such authentication forms.

In one embodiment, the interface shown in FIG. 3A can be used to facilitate the aspects that involve interfacing with a user. Whenever user management interface 310 is shown, whether as a result of start-up, complete log-out of a previous user session, or a request to perform fast-user-switching, user menu 311 is updated if any attached removable media storage device contains a configuration partition as described above. Detection of a configuration partition on attached removable media storage devices may be accomplished by supporting software. For example, the OS may perform a search of removable media partitions when populating user menu 311.

The list of native user account IDs in menu 311 is appended with any user account IDs found in any configuration partition of any attached removable media device. If adding the non-native user account IDs results in a duplicate ID, the duplicate non-native ID is modified as described above. For example, in FIG. 3B, which shows drop-down menu 311 in expanded form, users "John Doe," "Jane Doe," and "Guest" are all native to the computer. In the same figure, user account ID "John Doe" from a removable media has been modified prior to being appended to the list, to create the ID "John Doe_USB_001." A user who wants to initiate a session on this "John Doe_USB_001" account would select it from menu 311, enter a password in field 312, and click button 313. Then, if the password successfully decrypts the data partition linked to from the location associated with the user ID in the configuration partition, a session would be initiated using the user account state and data stored in the data partition.

In another embodiment, user menu 311 is dynamically updated whenever a removable media device with a configuration partition is detected (e.g., an event-driven implementation in contrast to a polling or scanning implementation as described above). In yet another embodiment, detection of a removable media device with a configuration partition triggers automatic presentation of user management interface 310 in the fast-user-switching mode.

Figure 4:
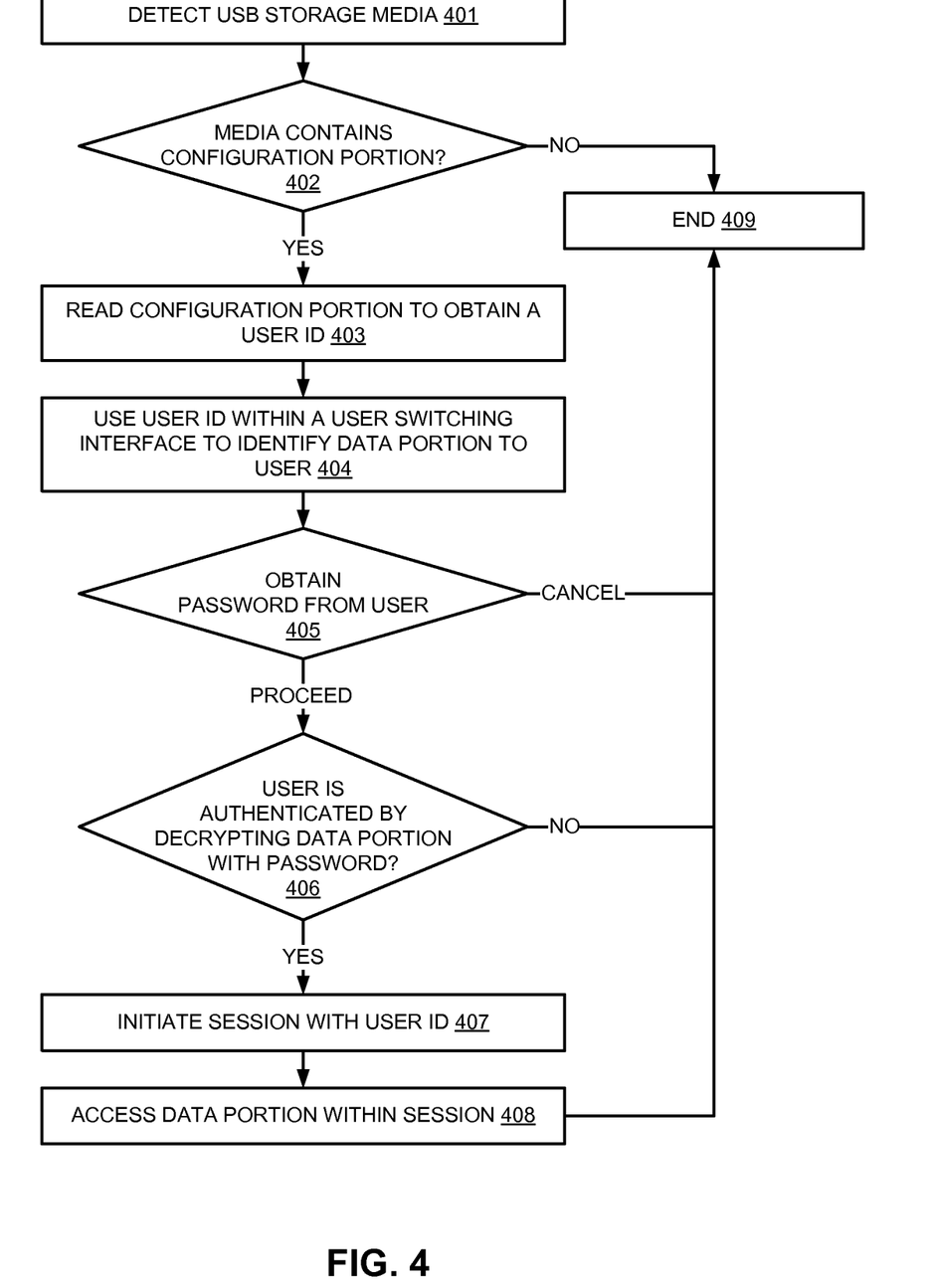
FIG. 4 is a flow diagram of an embodiment of a method for initiating a new user session from a portable media device.

FIG. 4 illustrates a flow diagram of an embodiment of a method for initiating a new user session from a removable storage media. The method may be performed by processing logic that may comprise hardware (e.g., circuitry, programmable logic, microcode, etc.), software (such as instructions run on a processing device), or a combination thereof. In one embodiment, the method is performed by a kernel of an operating system installed on a personal computer having a USB port in which a removable storage media device can be connected.

At block 401, a USB media device is detected. At decision 402, the media device is searched for a configuration partition. If such a partition is not found, no further action is taken. If, however, such a partition is found, it is read to obtain a user ID at block 403. In one embodiment, the user ID described in the configuration partition is added to the system list. The user ID is then used within a user switching interface (such as, for example, the interface illustrated in FIGS. 3A-B) at block 404 to identify the data partition to a user, who then provides a password at block 405. If the user proceeds with the switch of the user ID, flow continues to decision block 406. Alternatively, the user could generate a "user cancel" to cancel the switch, such as by pressing 'Esc' or clicking a 'Cancel' button, and end the process. At decision block 406, the password is used to decrypt the data partition. If decryption is unsuccessful, no further action is taken. If, however, decryption is successful, a user session is initiated with the user ID at block 407 and the OS is allowed to access, at block 408, the user account state and data stored in the data partition.

Figure 5:
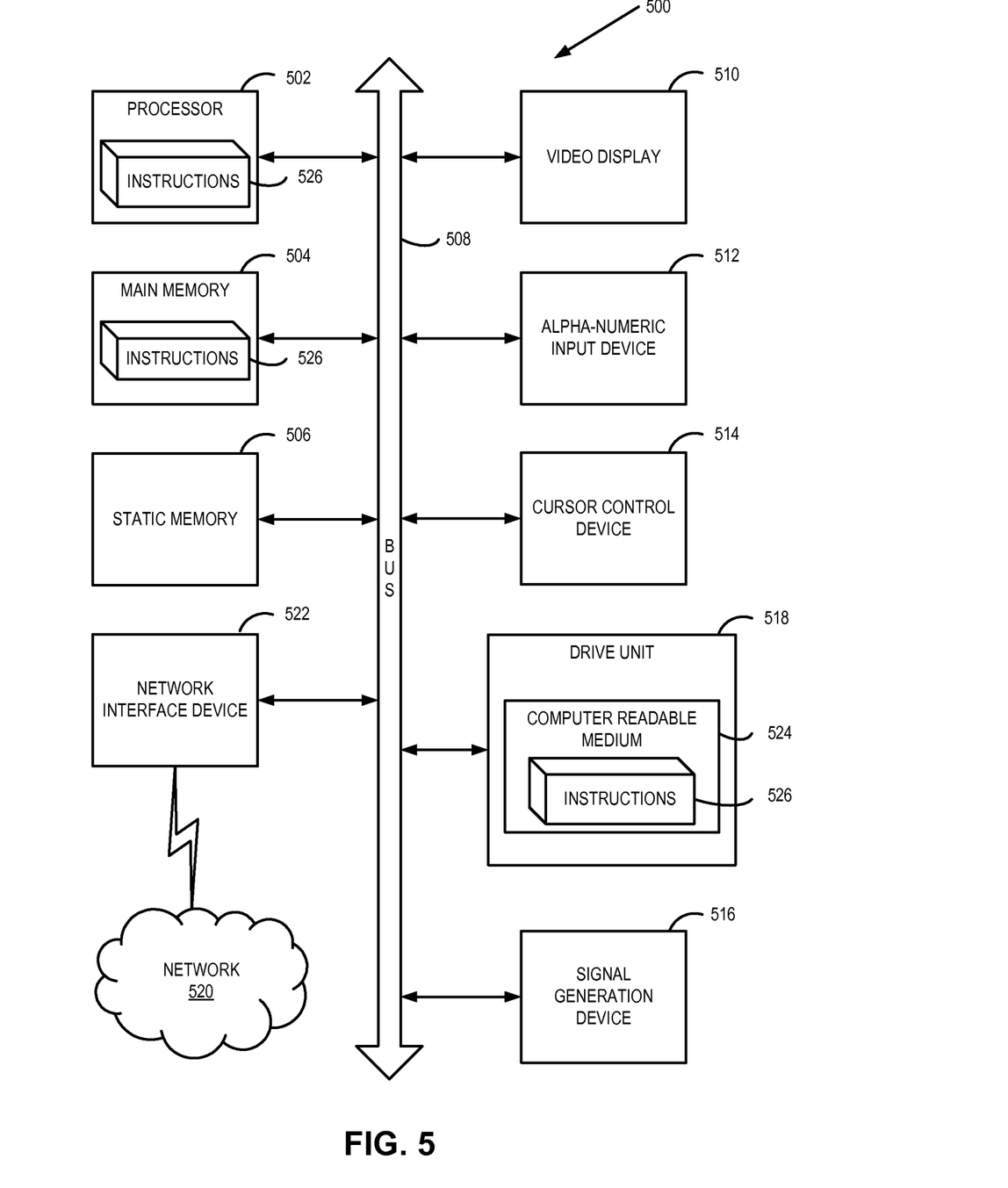
FIG. 5 is a block diagram of a computing device on which embodiments of the invention may be implemented.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory (drive unit) 518 (e.g., a data storage device), which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic (e.g. instructions 526) for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 524 on which is stored one or more sets of instructions (e.g., software instructions 526) embodying any one or more of the methodologies or functions described herein. The software 526 may also reside, completely or at least partially, within the main memory 504 and/or within the processing device 502 during execution thereof by the computer system 500, the main memory 504 and the processing device 502 also constituting machine-readable storage media. The software 526 may further be transmitted or received over a network 520 via the network interface device 522.

While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine readable storage medium" shall accordingly be taken to include, but not be limited to, solid-state memories, and optical and magnetic media.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:

detecting, by a processing device of a host computer, a removable computer readable medium selectively accessible from the host computer via a peripheral interface, wherein the host computer stores user data associated with at least one native account;

reading at the host computer a configuration portion of the removable computer readable medium to obtain a user identifier (ID) of a user and a location on the removable computer readable medium of a data portion, the data portion being encrypted;

storing user data associated with the user ID, wherein the user data comprises a home directory for the user comprising user account data of a non-native account created on another computer, the user account data not being previously stored on the host computer and the user account data comprising a user account directory associated with the user ID;

identifying the data portion with the user ID;

authenticating the user as being associated with the data portion in response to decrypting the data portion with a key input by the user;

initiating a session on the host computer, by a computer operating system, for the user with the user ID to access the user account data of the non-native account, wherein the session on the host computer integrates the home directory into the operating system through an intermediary translation layer, the home directory to provide the user with access to the user account data that is available to the user on the other computer as if the non-native account were another native account of the host computer, wherein the user ID for the session is aliased to a different user ID by the operating system to resolve a conflict with an existing user ID and the intermediary translation layer translates the user ID of a file within the data portion into the different user ID; and accessing the file within the decrypted data portion using the different user ID of the session.

2. The method according to claim 1, wherein the configuration portion comprises multiple user IDs, wherein each user ID is associated with the location of a different data portion.

3. The method according to claim 1, further comprising temporarily adding the user ID to a system user list maintained by an operating system of the host computer.

4. The method according to claim 1, wherein the computer readable medium is an external device capable of storage of computer readable data, connected via a Universal Serial Bus (USB) connection.

5. The method according to claim 4, wherein the key input by the user is received via at least one of a user sign-in interface or a fast-user switching user interface, and the interface is dynamically updated based at least on the user ID when the external device is first detected by an operating system (OS) of the host computer.

6. The method according to claim 1, wherein the intermediary translation layer is implemented by a device driver.

7. A non-transitory machine accessible storage medium comprising instructions that cause a processing device to:
   detect, by the processing device of a host computer, a removable computer readable medium selectively accessible from the host computer via a peripheral interface, wherein the host computer stores user data associated with at least one native account;
   read at the host computer a configuration portion of the removable computer readable medium to obtain a user identifier (ID) of a user and a location on the removable computer readable medium of a data portion, the data portion being encrypted;
   store user data associated with the user ID, wherein the user data comprises a home directory for the user comprising user account data of a non-native account created on another computer, the user account data not being previously stored on the host computer and the user account data comprising a user account directory associated with the user ID;
   identify the data portion with the user ID;
   authenticate the user as being associated with the data portion in response to decrypting the data portion with a key input by the user;
   initiate a session on the host computer, by an operating system, for the user with the user ID to access the user account data of the non-native account, wherein the session on the host computer integrates the home directory into the operating system through an intermediary translation layer, the home directory to provide the user with access to the user account data that is available to the user on the other computer as if the non-native account were another native account of the host computer, wherein the user ID for the session is aliased to a different user ID by the operating system to resolve a conflict with an existing user ID and the intermediary translation layer translates the user ID of a file within the data portion into the different user ID; and
   access the file within the decrypted data portion using the different user ID of the session.

8. The non-transitory machine accessible storage medium according to claim 7, wherein the removable computer readable medium is an external device capable of storage of computer readable data, connected via a USB connection, and wherein the user input key is received via at least one of a user sign-in interface or a fast-user switching user interface, and wherein the interface is dynamically updated based on at least the user ID when the external device is first detected by an OS of the host computer.

9. A system comprising:
   a memory; and
   a processing device coupled to the memory, the processing device to:
      detect, by a processing device of a host computer, a removable computer readable medium selectively accessible from the host computer via a peripheral interface, wherein the host computer stores user data associated with at least one native account;
      read, at the host computer, a configuration portion of the removable computer readable medium to obtain a user identifier (ID) of a user and a location on the removable computer readable medium of a data portion, the data portion being encrypted;
      store user data associated with the user ID, wherein the user data comprises a home directory for the user comprising user account data of a non-native account created on another computer, the user account data not being previously stored on the host computer, the user account data comprising a user account directory associated with the user ID;
      identify the data portion with the user ID;
      authenticate the user as being associated with the data portion in response to decrypting the data portion with a key input by the user;
      initiate a session on the host computer, by an operating system, for the user with the user ID to access the user account data of the non-native account, wherein the session on the host computer integrates the home directory into the operating system through an intermediary translation layer, the home directory to provide the user with access to the user account data that is available to the user on the other computer as if the non-native account were another native account of the host computer, wherein the user ID for the session is aliased by the operating system to resolve a conflict with an existing user ID and the intermediary translation layer translates the user ID of a file within the data portion into the different user ID; and
      access the file within the decrypted data portion using the different user ID of the session.

10. The system according to claim 9, wherein the computer readable medium is an external device capable of storage of computer readable data connected via a USB connection.

* * * * *